United States Patent [19]

Kuechler

[11] Patent Number: 5,117,747
[45] Date of Patent: Jun. 2, 1992

[54] BROILER FOR MEAT PRODUCTS AND THE LIKE

[76] Inventor: Irvin R. Kuechler, 172 E. 27th St., San Bernardino, Calif. 92404

[21] Appl. No.: 732,403

[22] Filed: Jul. 18, 1991

[51] Int. Cl.$^5$ .................. A47J 27/00; A47J 37/00
[52] U.S. Cl. ........................... 99/400; 99/401; 99/425; 99/446; 99/447; 126/41 R; 126/51
[58] Field of Search ................. 99/340, 385, 400, 401, 99/425, 444–446, 447, 450, 375; 126/41 R, 51; 219/443, 464, 401

[56] References Cited

U.S. PATENT DOCUMENTS

| | | | |
|---|---|---|---|
| 2,097,793 | 11/1937 | Howell | 99/446 |
| 3,568,590 | 3/1971 | Grice | 99/447 |
| 3,745,912 | 7/1973 | Field | 99/447 |
| 3,805,688 | 4/1974 | Gvozdjak | 99/425 |
| 3,938,431 | 2/1976 | Potvin | 99/375 |
| 3,964,378 | 6/1976 | Dunkelman | 99/375 |
| 4,598,634 | 7/1986 | Van Horn, II | 99/400 |
| 4,608,917 | 9/1986 | Faaborg | 99/400 |
| 4,650,968 | 3/1987 | Williams | 219/401 |
| 4,805,588 | 2/1989 | Reynolds | 126/51 |
| 4,936,202 | 6/1990 | Lin | 99/446 |

FOREIGN PATENT DOCUMENTS

| | | | |
|---|---|---|---|
| 271877 | 8/1912 | Fed. Rep. of Germany | 99/446 |
| 0143027 | 6/1990 | Japan | 126/51 |

Primary Examiner—Timothy F. Simone
Attorney, Agent, or Firm—John H. Crowe

[57] ABSTRACT

A broiler having a cabinet with spaced burners therein and grill sections above the burners. Inverted V-shaped radiants above the burners direct radiant heat outwardly and upwardly onto the grill sections. Deflector members above the radiants deflect convected heat passing around the radiants also outwardly onto the grill sections. Baffle elements directly over the deflector members and located between the grill sections prevent greases, etc. from dripping onto the deflector elements. An inclined drip pan is water cooled to prevent greases, etc. dropping from meat on the grill sections from burning and consequent smoking.

11 Claims, 3 Drawing Sheets

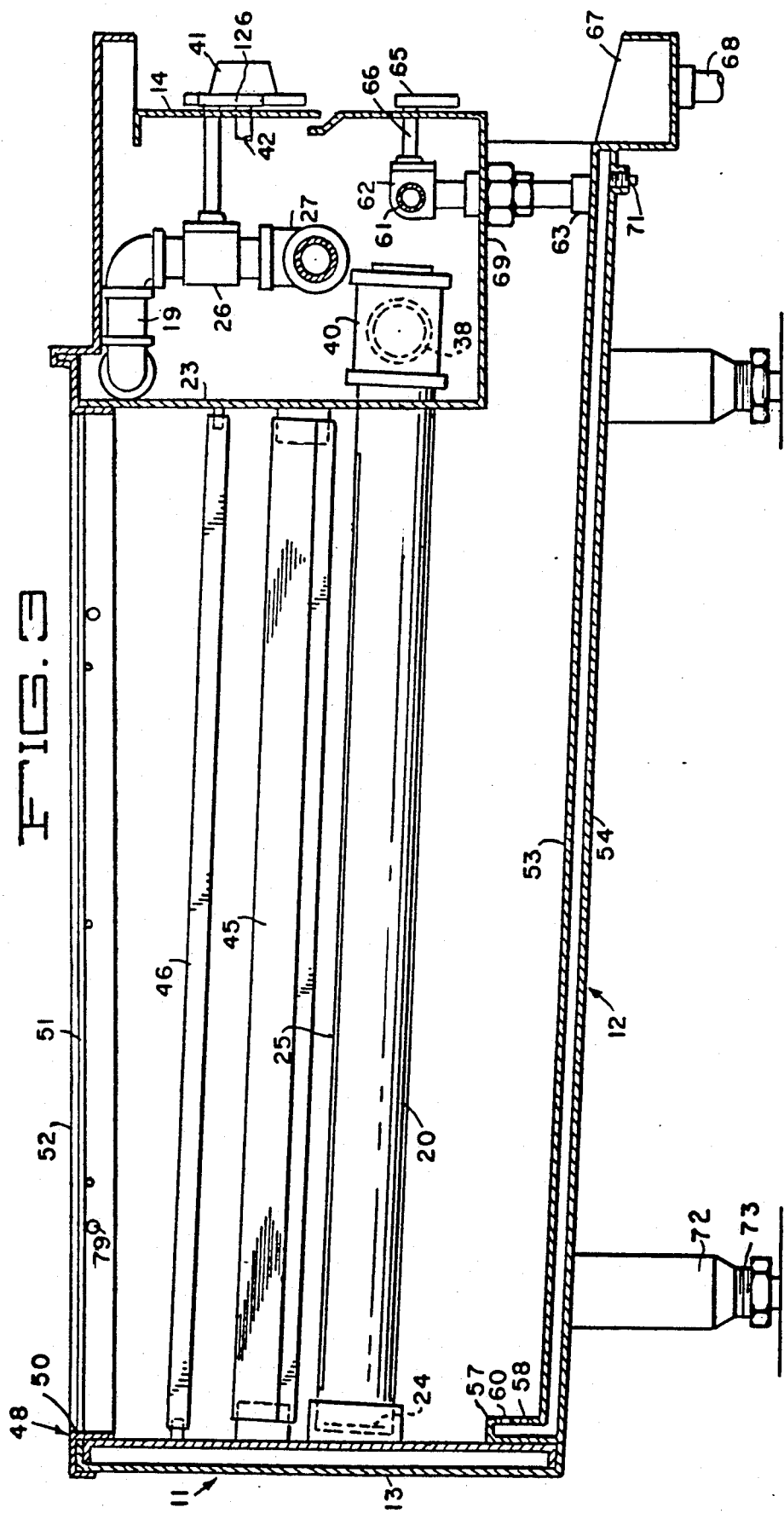

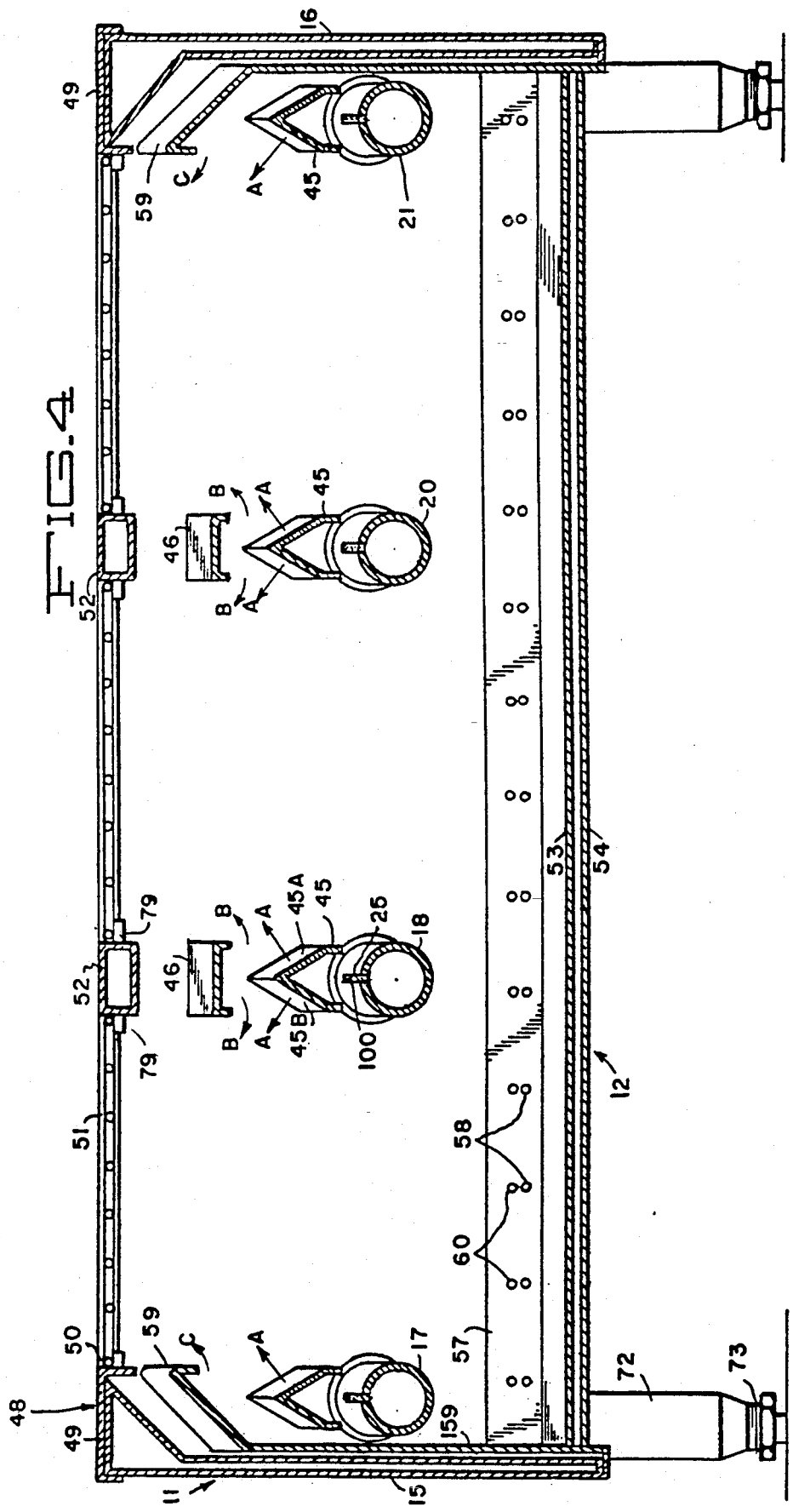

BROILER FOR MEAT PRODUCTS AND THE LIKE

BACKGROUND OF THE INVENTION

1. Field of the Invention

This invention relates to broilers for cooking meat products, such as hamburgers, chicken, steaks, fish, ribs, etc.

2. Description of the Prior Art

Broilers used in restaurants, fast-food establishments and the like generally comprise a grill on which meat products are placed and under which one or more heater units are located to broil the meat. Heat generated during the broiling process drives grease as well as meat juices from the meat. These drop into the hot interior of the broiler as well as onto the heating units, causing at least a portion thereof to vaporize and/or burn, resulting in a greasy smoke. Such smoke generally vents into the atmosphere to become unwanted air pollution. This type of pollution, resulting from burned meat greases and juices, as well as minute particles of the meat itself, is particularly obnoxious and unhealthful, especially in densely populated areas, so much so, that stringent laws have been enacted to limit emissions of the same and heavy fines are levied against violators.

Also, the smoke tends to deposit on the interior of the venting equipment for the broiler, giving rise to the possibility of dangerous fires, thus requiring frequent and time consuming cleaning.

Further, the greases and meat juices upon dropping into the hot interior of the broiler tend to deposit on the heating units and on the hot floor of the broiler to form a carbonized coating which is unsightly and difficult to remove.

In addition, the burning smoke tends to deposit on the meat itself, resulting in an unhealthful carbonaceous layer which is believed to be carcinogenic.

SUMMARY OF THE INVENTION

According to the present invention, a meat broiling apparatus is provided including a cabinet with a grill unit extending over the upper end thereof to support a number of meat products to be broiled.

Relatively widely spaced radiant heating elements are located below the grill, which elements have inclined surfaces to direct radiant heat onto the areas of the grill located over spaces intermediate the heating elements. Suitable heating means are located below the radiant heating elements to heat the same.

Deflector members are located above the radiant heating elements to divert upwardly moving heat convective air currents rising from the radiant heating elements outwardly to also apply heat to the areas of the grill located intermediate the heating elements. Thus, both radiant and convectional heat is applied to the meat products to uniformly broil the same and to increase the efficiency of utilization of heat energy derived from the heating means.

Baffle elements are provided over the deflector members in the plane of the grill units to prevent grease and meat juices from dropping onto the relatively hot deflector members which could otherwise cause burning and smoking.

An inclined double wall drip pan is provided at the bottom of the broiler cabinet through which water is passed to reduce the temperature of the pan. This prevents the drip pan from becoming hot enough to cause vaporization and/or burning of the greases, etc. and also enables the broiler apparatus to be made more compact and of smaller height since the drip pan can be placed relatively close to the heating means. The water overflowing from between the walls of the drip pan is caused to trickle over the upper surface thereof to further effect cooling.

It is thus a principal object of the present invention to provide a broiler for meat products that functions with minimal smoke and other polluting emissions.

It s another object of the invention to provide such a broiler that yields cooked products of moist, flavorful character having grill-marked but char-free surfaces.

It is yet another object of the invention to provide such a broiler of compact character capable of fitting into a space designed for the accommodation of a conventional polluting broiler.

It is still another object of the invention to provide such a broiler requiring minimal cleaning of its interior and cooperating venting means.

It is a further object of the invention to provide such a broiler capable of creating a substantially uniform heat zone in its broiling area under highly efficient operating conditions.

Other objects, features and advantages of the invention will become apparent to those skilled in the art in the light of subsequent disclosures herein.

BRIEF DESCRIPTION OF THE DRAWINGS

The manner in which the above and other objects of the invention are accomplished will be readily understood from the following specification when read in conjunction with accompanying drawings, wherein:

FIG. 3 is a longitudinal sectional view taken along line 3—3 of FIG. 1.

FIG. 4 is a transverse sectional view taken along line 4—4 of FIG. 1.

DESCRIPTION OF THE PREFERRED EMBODIMENT

Figure 1:
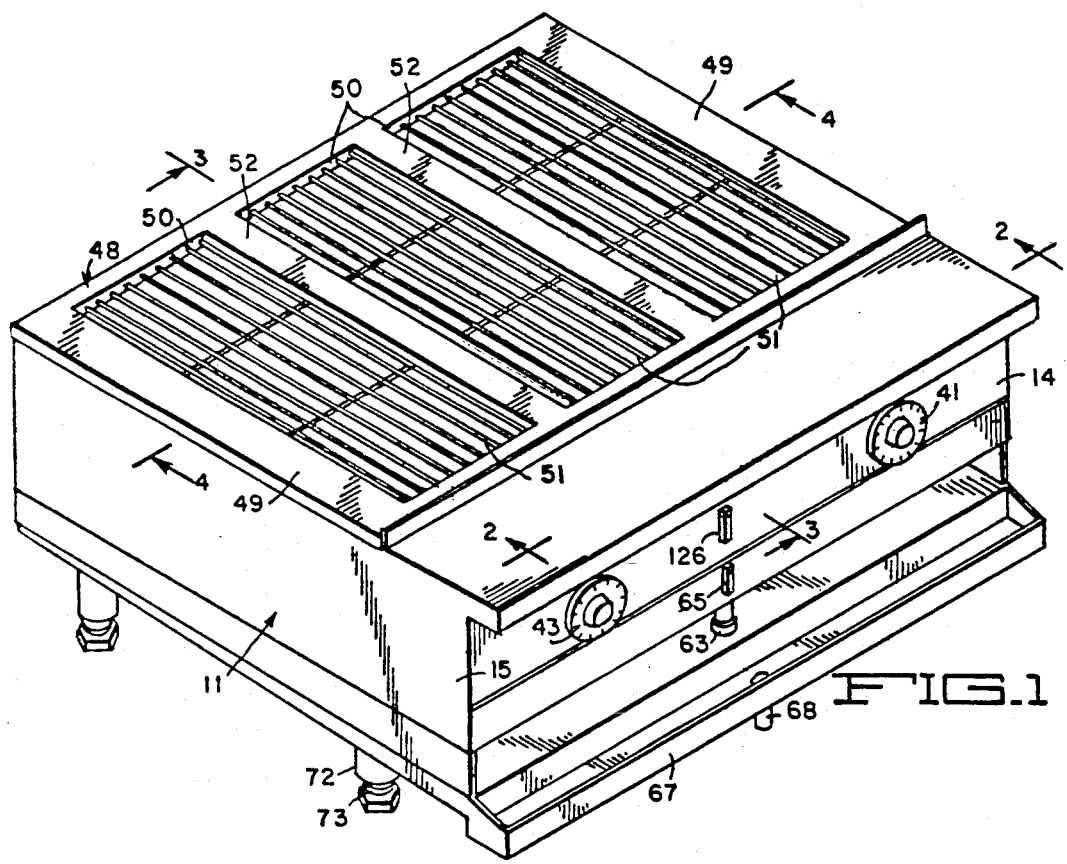
FIG. 1 is an isometric view of a broiler embodying a preferred form of the present invention.

Referring to the drawings, the broiler comprises a cabinet generally indicated at 11 which is closed at its lower end by a double walled drip pan unit 12. The cabinet further includes a rear wall panel 13, a front panel 14 and side panels 15 and 16, all suitably secured together to form a rigid structure. The panels 14, 15 and 16 are double walled to reduce transfer of heat outwardly from the interior of the cabinet.

A series of four relatively widely spaced gas burner tubes 17, 18, 20 and 21 are supported above the drip pan 12 between the rear wall panel 13 and an intermediate wall 23 suitably supported between the side panels 15 and 16. The tubes 17 to 22 are inclined to extend parallel to the plane of the drip pan. The rear ends of the tubes are closed as indicated at 24 (FIG. 3).

Each of the tubes 17 and 22 has a gas emitting slit 25 extending along its upper surface in which is fitted a suitable ribbon 100 (a strip of corrugated metal on edge) to enable a combustible gas passing through the tube to be ignited and flow upwardly in a substantially continuous line of flame along the length of the tube.

Figure 2:
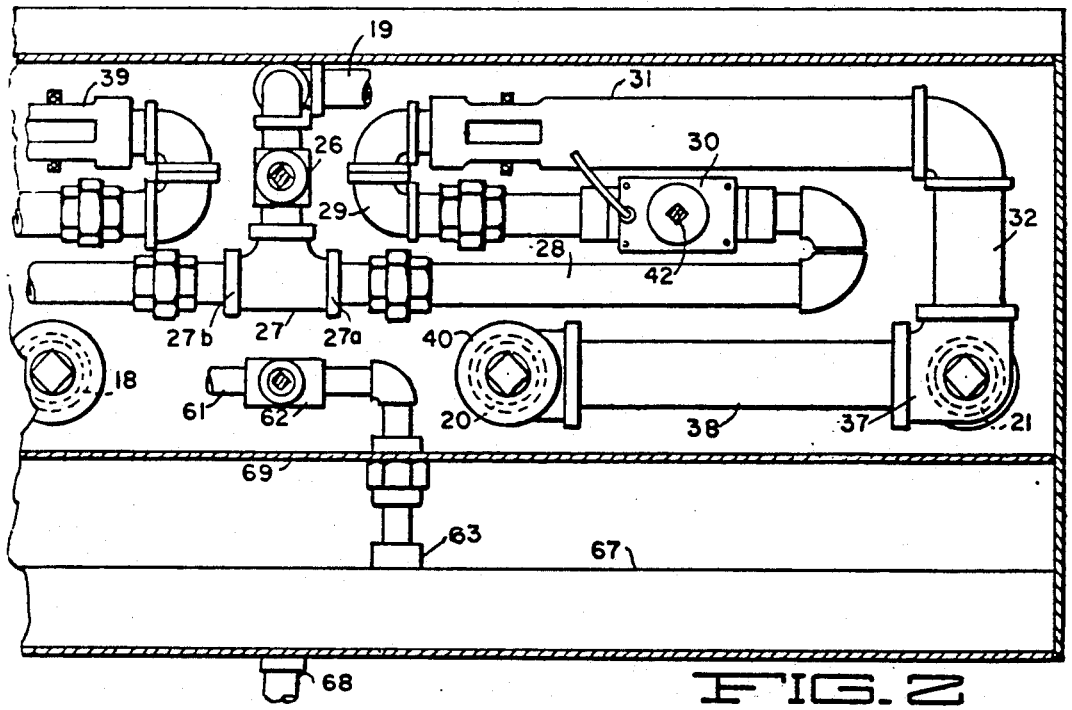
FIG. 2 is a transverse sectional view, partly broken away, of the broiler is taken along line 2—2 of FIG. 1.

Gas under controlled pressure is supplied from a suitable supply source (not shown) to the various burner tubes and for this purpose a gas supply line 19 (FIG. 2) is connected through a shutoff valve 26, controlled by a hand lever 126, to a T pipe fitting 27 having oppositely extending branches. The rightwardly extending branch 27a is connected through a line 28 and a thermostatically controlled valve 30 and line 29, to the inlet of an aspirator 31 of conventional construction. The aspirator effects a proper mixture of air and gas to be passed through a line 32 to a pipe fitting 37 to which the rightmost burner tube 21 is connected. The fitting 37 is also connected by line 38 to a fitting 40 to which the burner tube 20 is connected.

The left hand branch 27b of the T pipe fitting 27 is connected to a similar arrangement of piping (not shown), including an aspirator partly shown at 39 and a thermostatically controlled valve, to the remaining burner tubes 17 and 18.

Although any commercially available aspirator and thermostatically controlled valves may be employed for delivering a controlled amount of gas to the burner tubes, I prefer to use those disclosed in my U.S. Pat. No. 4,899,724, issued on Feb. 13, 1990, and reference may be had to such patent for details.

A desired temperature setting for heat developed by the burner tubes 20 and 21 may be effected by an adjustable regulator knob 41 (FIGS. 1 and 3) located in front of the wall panel 14 and connected by a shaft 42 to the valve 30. A similar regulator valve 43 is provided to similarly control the thermostatic controlled valve for the burner tubes 17 and 18.

An elongate radiant heat transmitting element or radiant 45 is supported directly above each of the burner tubes 17 to 21 and between the rear wall panel 13 and intermediate wall 23. Such radiant 45 is preferably formed of steel having a cross sectional shape of an inverted V and is inclined in length to extend parallel to the underlying burner tube.

Elongate heat deflector members 46 are located directly above the two radiants overlying the burner tubes 18 and 20 and also extend between the rear wall panel 13 and the intermediate wall 23 and are inclined to extend parallel to the radiants. Other elongate deflector members 59 overlie the outer burner tubes 17 and 21 and also extend between the wall panel 13 and intermediate wall 23. The members 46 are integral with heat shield walls 159.

It will be noted that the deflector members 46 and underlying radiants are substantially the same width as the underlying burner tubes. Likewise, the outer deflector members 59 directly overlie the underlying radiants.

The upper open end of the cabinet 11 is surmounted by a cover member 48 having three rectangular openings 50 therein to receive three grill sections 51 of spaced small diameter rods. The openings 50 are defined by outer baffle sections 49 and inner baffle section 52 formed integral with the cover 48. Each baffle section directly overlies a deflector member i.e., 46 and 59, and is of substantially the same width. Thus, any greases and or meat juices dropping from meat laid over the adjacent grill section 51, or even over the baffle section, will be prevented from dropping onto the underlying heated deflector member 46 or radiant 45 where they would otherwise develop smoke and/or catch fire.

Support pins 79 extend from the sides of the baffle sections 49 and 52 to removably support the grill sections 51 generally in the plane of the cover 48.

The inclined drip pan unit 12 comprises closely spaced walls 53 and 54 which extend entirely across the width and length of the cabinet 11 and are hermetically sealed along their rear, side and front edges. However, the rear portion of the pan unit is formed into an upwardly extending section (FIGS. 3 and 4) and two horizontal rows 58 and 60 of orifices are formed in the forward vertical wall 57 to allow minute streams of water to flow therefrom onto the upper surface of the inclined wall 53.

Water under pressure is provided by a supply line 61 (FIG. 2) in which is located a water control valve 62. The line 61 passes through a floor panel 69 and is connected by a fitting 63 to the interior of the pan unit 12 whereby the interior of the pan unit may be filled with water.

For the purpose of controlling the flow of water through the pan unit 12, a control handle 65 is located in front of the wall panel 14 and is connected to the valve 62 by a shaft 66. Preferably, the water flow is controlled to cause the water to overflow through the lower row 58 of orifices only, the upper row 60 acting as a safety overflow to prevent undue water pressure to be applied to the pan unit.

It will be noted that water emerging from the orifices 58 will run in small trickles down the upper surface of the pan unit and thus aid in cooling the latter. However, the flow of water is also so controlled to enable the pan unit to be heated sufficiently to prevent the grease, etc., from solidifying on the surface of the pan unit.

A waste collecting tray 67 is attached to the forward end of the cabinet 11 to catch the runoff of water and greases moving down the upper surface of the pan unit 12, and to direct the same to a suitable sewer line 68.

A removable screw plug 71 is provided to drain water from the interior of the pan unit when desired.

The cabinet 11 is supported by legs 72 which have vertical adjustment devices 73 attached to the bottoms thereof, enabling the cabinet to be so adjusted in height that water and grease etc. will flow evenly down over the pan unit 12 and off into the collecting tray 67.

In broiling meat products, the latter are placed on the grill sections 51 and the heat regulating knobs 40 and 41 are set to effect an optimum broiling temperature in the areas where the meat products are placed on the grill sections. As the radiants 45 are heated by the gas flames from the burner tubes 17 to 21, they emit radiant heat generally in a direction normal to the planes of their sides, i.e. in the direction of the arrows A (FIG. 4), to apply radiant heat to the areas of the grill sections intermediate the baffle sections 49 and 52.

At the same time, conventional air heated by flames emanating from the burner tubes and from the radiants 45 flows generally upward around the radiants 45 and is deflected outwardly in the direction of the arrows C by the deflector members 46 and in the direction of the arrows 6 by the deflector members 59 to likewise apply heat to the grill areas intermediate the baffle sections 49 and 52.

As water is admitted to the pan unit 12, it cools the same to a degree to prevent grease, etc. from vaporizing or burning upon contact with the pan unit, which would otherwise generate smoke, and thus enables the grease to flow along the pan surface to the waste tray 67. Thus, also, the grease, etc. is prevented from adhering and carbonizing on the pan surface which would otherwise require frequent and time consuming cleaning.

Cooling of the pan unit 12 allows the pan unit to be located relatively close to the burner tubes, thus resulting in a compact broiler apparatus of relatively short height.

Further, I have discovered that because of the cooling effect caused by the drip pan unit 12, a portion of the heat emanating from the burner tubes 17 to 21 is drawn downward toward the relatively cool surface of the pan unit and then spreads outwardly before rising so as to more uniformly heat the grill areas between the baffle elements 49 and 52. This, as well as the aforementioned utilization of both radiant and convected heat results in a highly efficient use of the heat derived from the burners and thus reduces the cost of operation while effecting a more uniform broiling of the meat throughout. Also, it has been found by comparison tests with meat broiled on conventional broiling equipment, that the meat broiled on my improved apparatus is less dry and tastes much juicier with more flavor than that broiled on other equipment.

The cooling effect on the surface of the pan unit 12 may be regulated by controlling the amount of water flowing therethrough. Also, by restricting the flow to a desired degree, the pan unit 12 may become hot enough to generate steam which will pass outwardly through the upper row 60 of orifices to cause a dampening effect on the meat.

It will be noted that more or fewer groups of radiants, burner tubes, deflector members and overlying baffle sections may be incorporated in the broiler with an obvious rearrangement of gas supply lines, permitting independent heating control of different areas of the grill sections. Thus, different groups may be utilized to broil different types of meat products or one group may be utilized to broil meat products while another group may be utilized to maintain already broiled products at a desired temperature until utilized.

Also, it will be seen that with obvious modification, other forms of heating means, such as electric heating elements, may be used to heat the radiants and to provide convectional heat.

From the foregoing it will be seen that I have provided a compact broiler with means for substantially eliminating generation of smoke due to burning and/or vaporization of greases emanating from meat products being broiled. The broiler also eliminates coating of smoke particles as well as greases onto the burners and bottom of the broiler where they would otherwise tend to adhere in a carbonaceous layer which is difficult to remove. Further, the broiler eliminates dissemination of smoke and other air pollutants into the atmosphere. Additionally, the construction of the broiler enables it to be made smaller and more compact than would otherwise be possible. In summary, it goes without saying that my novel broiler is not strictly limited to use with meat products but can be employed for the cooking of any food, meat or otherwise, to which it lends itself.

I claim:

1. A compact broiler suitable for cooking meat products comprising:

cabinet means open at the top;

grill means supported across said top by said cabinet means;

radiant heating means and means supporting same under said grill means;

deflector means positioned over said radiant heating means to deflect convective heat therefrom towards said grill means, and supporting means therefore;

baffle means overlying said deflector means in the plane of said grill means to shield said deflector means and said radiant heating means from grease and other drippings from meat being cooked on said grill means and means supporting said baffle means in position for that purpose;

drip pan means positioned under said radiant heating means to catch said grease and other drippings from said meat and means supporting said drip pan means in position there, said drip pan means being inclined upwardly toward an edge below one side of said grill means;

means for conveying a suitable heat transfer liquid in contact with the underside of said drip pan means so as to flow upwardly toward said edge to thereby cool the drip pan means when the broiler is in operation;

means for directing said heat transfer liquid to trickle downwardly over the surface of said drip pan means from said edge; and means supporting said drip pan means in position for use in said compact broiler.

2. A compact broiler in accordance with claim 1 including means for receiving downwardly trickling heat transfer liquid and accompanying meat drippings from said drip pan means.

3. A compact broiler in accordance with claim 2 in which said drip pan means comprises inclined plate means and the heat transfer liquid conveying means includes second plate means spaced therebelow, both plate means extending substantially across the area directly below said grill means.

4. A compact broiler in accordance with claim 3 including means for adjusting the angle of inclination of said inclined plate means.

5. A compact broiler in accordance with claim 4 wherein said means for directing said heat transfer liquid to trickle downwardly over the upper surface of said drip pan means from said edge comprises orifice means for controlling the flow of said liquid over said drip pan means.

6. A compact broiler in accordance with claim 5 in which said orifice means comprises a horizontal row of orifices just above said edge.

7. A compact broiler in accordance with claim 6 including a second horizontal row of orifices disposed above the first row of orifices for admitting an overflow of said heat transfer liquid onto said drip pan means.

8. A compact broiler in accordance with claim 1 in which said radiant heating means includes at least one radiant heating element with angled side surfaces inclined to direct radiant energy therefrom outwardly toward said grill means either side of said radiant heating element.

9. A compact broiler in accordance with claim 7 in which said radiant heating means includes at least one radiant heating element with angled side surfaces inclined to direct radiant energy therefrom outwardly toward said grill means either side of said radiant heating element.

10. A compact broiler in accordance with claim 9 in which said at least one radiant heating element comprises a plurality of radiant heating elements, said deflector means comprises an equal plurality of deflector elements positioned respectively over the radiant heating elements and said baffle means comprises an equal plurality of baffle strips positioned respectively over said deflector elements.

11. A compact broiler in accordance with claim 10 in which the radiant heating elements, deflector elements and baffle strips are of elongate form and substantially equal length and positioned in parallel vertically arranged groups of three each.

* * * * *